C. A. MASTERSON.
Improvement in Lifting Jacks.
No. 123,784. Patented Feb. 20, 1872.
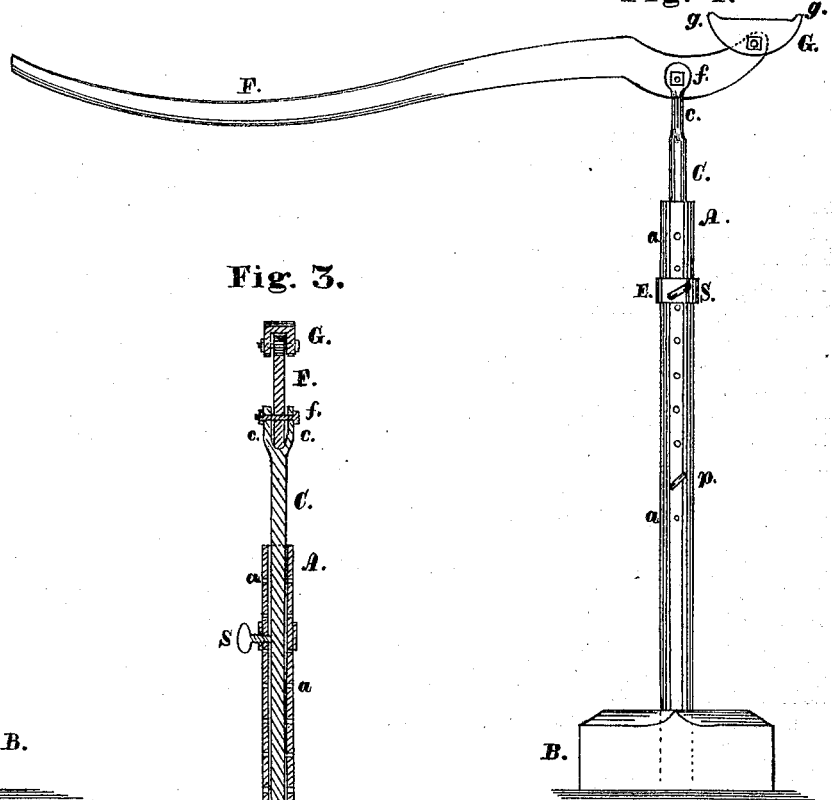
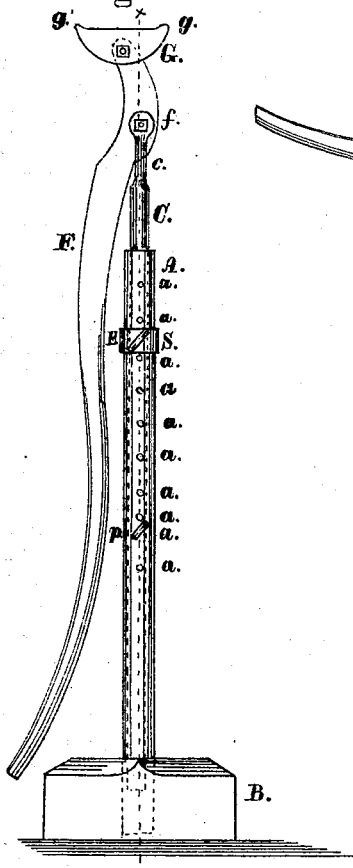
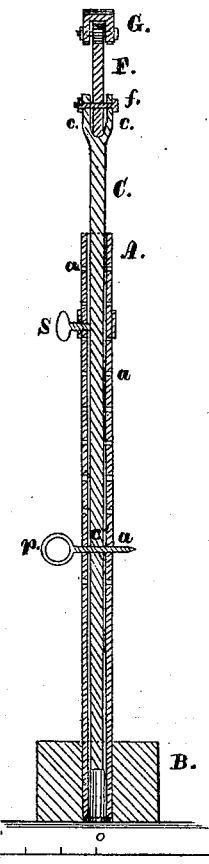
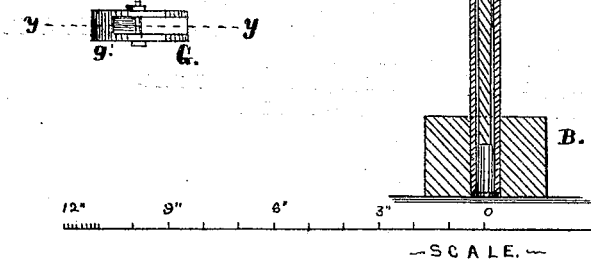
WITNESSES:
William T. Cussins
Robert R. Montgomery
INVENTOR:
Carson A. Masterson,
Per Charles P. Housum
His Attorney.

UNITED STATES PATENT OFFICE.

CARSON A. MASTERSON, OF DECATUR, ILLINOIS.

IMPROVEMENT IN LIFTING-JACKS.

Specification forming part of Letters Patent No. 123,784, dated February 20, 1872.

Specification describing certain Improvements in Lifting-Jacks, invented by CARSON A. MASTERSON, of Decatur, in the county of Macon and State of Illinois.

My invention relates to an improvement in lifting-jacks; and consists of a forked rod, in which the lever is bolted and pivoted. The rod is placed in a hollow cylinder, which is attached to a block or support at the bottom. The rod can be raised and lowered for different heights of axles, and secured with a pin passing through holes in the rod and cylinder, or by a set-screw. A knuckle bolted to and working on the end of the lever has projections on top, so that when it is placed under the axle it will not slip off; the whole is so arranged that when the lever is pressed down and the axle is raised the lever is held.

Figure 1 is a side elevation of a lifting-jack embodying my invention, showing the position of lever and knuckle when placing it under the axle. Fig. 2 shows the position of lever and knuckle after the axle is raised. Fig. 3 is a section taken through the dotted lines $xx$, Fig. 2. Fig. 4 is a view of bottom of knuckle, and Fig. 5 a section of the same taken through the dotted lines $yy$, Fig. 4.

A is a hollow cylinder fastened into the foot or support B. C is a rod forked at $cc$. This rod is placed in the cylinder A. $aa$ are holes in the cylinder; $c'$, hole in the rod, through which passes the pin $p$. The rod can be raised and lowered to suit the height of the axle and secured with the pin passing through the holes $ac'$; or a band, E, may be shrunk on the cylinder, and with a set-screw, S, the length of the jack may be regulated. F is a lever having its fulcrum and pivoted in the forks $cc$, a bolt, $f$, passing through the forks and the lever. G is a knuckle pivoted near the top end of the lever. It is made so that it shall be heavier, as shown at $g'$, Fig. 5, so that, when the lever is raised to place it under the axle, that it will be in a horizontal position, as shown in Fig. 1. The knuckle has projections $gg$, which embrace the axle and prevent it from slipping off.

The jack is placed in the position, as shown in Fig. 1, and the knuckle G placed under the axle by bearing the handle of the lever downward until it touches, or nearly so, the foot B, as shown in Fig. 2, so that the center of the bolt of the knuckle is back of the fulcrum of the lever when the lever is held, thereby raising the wheel and axle, and it is allowed to rest while the wheel is washed or tended to, as necessity requires. By a reverse operation the axle and wheel are lowered when desired.

The advantage of the improvement is that the knuckle, provided with the projections $gg$, will not slip off of the axle, and when the lever is pressed down the knuckle will revolve on the end of the lever, and the weight being in rear of the fulcrum (when raised) the lever is held; also, the devices for regulating the height of the jack.

I know that lifting-jacks have been constructed so that when the lever was pressed down and the weight was back of the fulcrum of the lever it was held; but

I claim as my invention—

The combination of the cylinder A, foot-piece B, rod C, lever F, and knuckle G, with the projections $g\ g'$; the height of the jack regulated by the set-screw S or by the pin $p$, passing through holes $aa$ in the cylinder and hole $c'$ in the rod, all arranged substantially as shown and described.

CARSON A. MASTERSON.

Witnesses:
CHARLES P. HOUSUM,
JACOB I. BEAR.